United States Patent Office 3,492,289
Patented Jan. 27, 1970

3,492,289
POLYMERS OF ALKYLENIMINES
Richard H. Symm, George E. Ham, and Clarence R. Dick, Lake Jackson, Tex., assignors to The Dow Chemical Company, Midland, Mich., a corporation of Delaware
No Drawing. Filed June 13, 1966, Ser. No. 556,859
Int. Cl. C08g 33/08; C07d 23/02
U.S. Cl. 260—239                              3 Claims

ABSTRACT OF THE DISCLOSURE

A random structured alkylenimine (AI) polymer having an average molecular weight between about 300 and about 3,000 and having an average of between about 0.5 and 1 aziridine ring per polymer chain is prepared by combining an AI under anhydrous conditions with an aluminium trialkyl catalyst, or essentially anhydrous conditions (no more than 10 weight percent water) with an acid catalyst, allowing the AI to polymerize until a product having the desired molecular weight is obtained, and stopping the polymerization by neutralizing the catalyst. These polymers are useful bactericides and, in addition, are curing agents for epoxy resins.

---

This invention relates to polymers of alkylenimines having a molecular weight in the range of from about 300 to about 3,000 and having intact aziridine ring terminating groups and to methods for producing such polymers. The novel polymers of this invention have demonstrated utility as bactericides, and should find wide application where the chemically active aziridine ring is useful, e.g., as curing agents for epoxy resins.

For the purpose of this invention, the term alkylenimine (hereinafter AI) refers to compounds of the form

wherein R is hydrogen or an alkyl group having from one to four carbon atoms. The term ethylenimine (hereinafter EI) refers to the compound of the above formula wherein R is hydrogen.

Wilson, U.S. Patent 2,553,696, issued May 22, 1951, discloses a method for producing dimers, trimers, and tetramers of AI, apparently terminated by aziridine rings, by polymerizing AI in a moderately alkaline aqueous solution, quenching the reaction with a large quantity of caustic soda, and rapidly removing the desired product from the mixture.

Polyalkylenimines (hereinafter PAI) having a molecular weight up to 500,000 and higher but lacking the intact aziridine rings can be obtained by polymerizing AI in an aqueous medium in the presence of an acid catalyst. The polymerization of AI has been comprehensively reviewed by Jones, "Polymerization of Olefin Imines," in P. H. Plesch, ed., The Chemistry of Cationic Polymerization (New York, MacMillan, 1963), pages 521–534.

It was formerly hypothesized that the polymer chains produced by this and related methods were terminated by intact aziridine rings. The recent use of infrared spectroscopy techniques for the analysis of PAI has demonstrated that this hypothesis was incorrect.

It has now been discovered that PAI having a significant proportion of intact terminal aziridine rings (i.e., an average of from about 0.5 to about 1 aziridine ring per polymer chain) and having a molecular weight of from about 300 to about 3,000 can be prepared by polymerizing AI in the presence of an aluminum trialkyl catalyst or an acid or Lewis acid catalyst, under essentially anhydrous conditions, at temperatures ranging between room temperature (i.e., about 20° C.) and the boiling point of the resulting mixture. The AI is allowed to polymerize under these conditions until the reaction is between about 20 percent and 100 percent complete, as shown by the fraction of AI remaining. With an acid catalyst, up to about 10 percent by weight of the reaction mixture may be water. With an aluminum trialkyl catalyst, water must be excluded from the reaction mixture.

In the process of the present invention, the alkylenimine polymerizes to a compound which may be represented by the empirical formula

wherein $n$ is an integer from about 6 to about 70, R is hydrogen or an alkyl group having from one to four carbon atoms, e.g., methyl, ethyl, propyl or butyl, and $R_1$ has the same meaning except that at least one $R_1$ in each unit of the polymer must be hydrogen. The polymers of AI thus produced have a molecular weight of from about 300 to about 3,000, with an average aziridine ring content of at least about 0.5 molecule. With molecular weights between about 300 and about 1,000, the polymers have an average aziridine ring content of from about 0.8 to about 1 per molecule. The polymers are not straight-chained; branching may and does occur. The terminal groups on the polymer chain are intact aziridine rings and primary amine groups.

With an acid catalyst, polymers may be prepared according to the process of the present invention having molecular weights above 3,000. However, as the polymerization continues above this point, the chain terminating reactions destroy the aziridine rings, as in conventional processes for polymerizing AI. Such higher molecular weight products thus have an average aziridine ring content of less than about 0.5 per molecule.

When an aluminum trialkyl catalyst is employed, the practical limit of the average molecular weight of the polymers obtained is about six or seven hundred. A reaction time of about 100 hours is necessary to produce these polymers with an aluminum trialkyl catalyst. The use of an acid catalyst permits much shorter reaction times, e.g., about ten to fifteen hours for a polymer with a molecular weight of six or seven hundred.

When an acid catalyst is employed, the reaction is short-stopped with a strong base, such as the alkali metal hydroxides, e.g., sodium hydroxide, potassium hydroxide; the alkaline earth hydroxides and oxides, e.g., magnesium hyroxide, calcium hydroxide, barium hydroxide, magnesium oxide, calcium oxide, barium oxide, and the like. Short-stopping with an aluminum trialkyl catalyst may be accomplished with a polar solvent capable of hydrolyzing the catalyst, such as an alcohol.

Aluminum trialkyl catalysts used to prepare the polymers of this invention have the formula $AlR_3$, where R is an alkyl group having from about 1 to 20 carbon atoms. Examples of suitable aluminum trialkyl catalysts are triethyl aluminum, tripropyl aluminum, triisobutyl aluminum, tridecyl aluminum, tridodecyl aluminum, and the like. The preferred aluminum trialkyl catalysts are triisobutyl aluminum, triethyl aluminum and tridecyl aluminum. In general, any acid catalyst is suitable for the process of the present invention. Examples of suitable acid catalysts include mineral acids, such as hydrochloric acid, hydrobromic acid, sulfuric acid, and the like; strong organic acids, such as p-toluene sulfonic acid, trichloroacetic acid, trifluoroacetic acid, and the like; strongly acidic ion exchange resins, such as the Amberlite sulfonic acid ion exchange resins sold by the Rohm and Haas Company, the acidic Dowex 50 ion exchange resins sold by The Dow Chemical Company, and the like, Lewis acids, such as aluminum trichloride, and the like. The mineral acids will cause precipitation of salts, thus stopping the polymerization, when used with solvents other than the alcohols.

The amount of the catalyst used may be from about 0.05 percent by weight to about 20 percent by weight or higher of the AI present. Preferably, from about 2 to about 10 percent by weight of the catalyst is used. An amount of the catalyst sufficient to produce polymerization under the conditions specified herein is all that is required. This shall be referred to hereinafter as a catalytic amount.

In practice, the novel polymers of this invention are prepared by mixing the AI and catalyst in an organic solvent in which the reactants are soluble or dispersible and that is non-reactive with the AI and the catalyst under the conditions of polymerization used (hereinafter, an inert solvent). Representative suitable solvents for use with the acid catalysts, which may be used either singly or as mixtures, include the alcohols containing from 1 to 4 carbon atoms, such as methyl alcohol, ethyl alcohol, isopropyl alcohol, isobutyl alcohol, and the like; the aliphatic hydrocarbons containing from 4 to about 10 carbon atoms, such as n-butane, n-pentane, iso-hexane, n-heptane, iso-octane, n-decane, and the like; cycloaliphatic hydrocarbons, such as cyclohexane, methyl- and dimethyl-substituted cyclohexane (e.g., 2-methyl and 2-ethyl cyclohexane), and the like; aromatic hydrocarbons, such as benzene, toluene, and the like; ethers, such as diethyl ether, dimethyl and diethyl ethers of ethylene glycol, diethylene glycol, and the like. The preferred solvents are the alcohols containing from 1 to 4 carbon atoms. With the aluminum trialkyl catalysts, the solvent must be non-polar. Thus, suitable solvents in this case include the aliphatic, cycloaliphatic, and aromatic hydrocarbon solvents listed above. The preferred solvents are benzene and toluene.

The resulting mixture of AI, solvent, and catalyst is stirred, heated, and maintained at a temperature between about 20° C. and the boiling point of the mixture for a time sufficient to allow the polymerization reaction to be carried out. The reaction time will, of course, vary depending on the temperature used. Reflux temperature is generally advantageous. A temperature between 25° and 115° C. is preferred. Reaction times of from about 2 hours in the case of an acid catalyst to about 100 hours in the case of an aluminum trialkyl catalyst have been found advantageous. The polymerization is carried out until the desired average molecular weight is obtained, which may be determined by sampling the reaction mixture. When an acid catalyst is employed, the polymerization is stopped by the addition of a sufficient amount of a strong base, such as sodium hydroxide or potassium hydroxide, to neutralize the acid catalyst. When an aluminum trialkyl catalyst is used, the polymerization may be stopped by hydrolyzing the catalyst, with, for example, an alcohol, such as methanol, ethanol, isopropanol, or the like.

The polymers of the present invention are useful as bactericides and as curing agents for epoxy resins and other uses wherein the reactive aziridine ring is desired. The polymers are viscous fluids which cannot be distilled without decomposition.

The following examples described completely representative specific embodiments of the present invention and include preferred embodiments of the invention claimed. The invention is, however, to be limited only by the scope of the claims appended hereto.

ACID CATALYSTS

Example 1

Into a reaction vessel equipped with means for stirring, temperature control, and refluxing are placed 200 g. of methyl alcohol and 201 g. of EI. The mixture is cooled to 10° C., and 2.0 g. of 96 percent by weight sulfuric acid is added. This mixture is slowly warmed to 66° C. and held at a temperature between 66° and 74° C. for 7 hours. At this time the EI is substantially completely converted to a polymeric product. Excess NaOH dissolved in methyl alcohol is added to neutralize the acid catalyst, and the resulting sodium sulfate is filtered off. The volatiles are removed by flash distillation and are found to contain 11.7 g. of the dimer of EI (aminoethyl aziridine). The residue is a fluid polymer having an average molecular weight of 560 as determined by viscosity measurement and an aziridine ring content of 6.4 weight percent, or an average of 0.9 terminal aziridine rings per molecule, as determined by infrared spectroscopy.

Substitution of propylenimine for EI in the above preparation gives a similar aziridine ring-terminated polymer.

Example 2

To a reaction vessel equipped as in Example 1, 41.6 g. of EI and 93.4 g. methyl alcohol is added. The mixture is cooled to 10° C., and 4.2 g. of p-toluene sulfonic acid is added. The mixture is slowly brought to and maintained at 50° C. After 9⅓ hours, 96 percent conversion of the EI to polymer has taken place. The reaction mixture is sampled at this time and the monomer-free polymeric product has an average molecular weight of 720 and an aziridine ring content of 5.6 weight percent, or an average of 1.0 terminal aziridine rings per molecule. The mixture is allowed to cool to room temperature. After 36 days at this temperature the mixture is sampled and has an average molecular weight of 2700 and an aziridine ring content of 0.7 percent by weight. This corresponds to an average of 0.5 aziridine rings per polymer chain.

Example 3

A quantity of 1250 ml. methyl alcohol and 250 ml. EI is added to a reaction vessel equipped as above, cooled to 10° C., and 9 ml. of hydrochloric acid catalyst is added. The mixture is heated to 35° C. over a period of 30 minutes and held at that temperature for 1½ hours. A quantity of 5.7 g. of NaOH is added to neutralize the hydrochloric acid, the reaction mixture is cooled, and the volatiles are stripped off, leaving a fluid polymeric residue containing sodium chloride. The residue is mixed with diethyl ether, the salt filtered out, and the ether evaporated. Analysis of the product shows that 45 percent by weight of the ethylenimine has been converted to yield 42 percent by weight of the dimer and a balance of a fluid polymer having an average molecular weight of 465 and an aziridine ring content of 8.9 weight percent, an average of 1.0 terminal aziridine rings per molecule.

Example 4

Additional runs were made with different solvents according to the procedure in Example 3. The results are shown below in Table II.

TABLE II

| Solvent | Percent conversion of IE | Yield dimers and trimers | Yield higher molecular wt. polymers |
| --- | --- | --- | --- |
| Benzene | 30.6 | 91.5 | 8.5 |
| Dioxane | 35.4 | 94.4 | 5.6 |
| Cyclohexane | 41.3 | 92.5 | 7.5 |
| n-Hexane | 44.8 | 98.8 | 1.2 |
| Isopropyl alcohol | 75.0 | 97.6 | 2.4 |

Table II shows that an acid catalyst is operable in the other solvents evaluated. Allowing the polymerization to continue for longer times before neutralizing the catalyst gives a larger proportion of the higher molecular weight polymers. The best results are obtained with the alcohols containing from 1 to 4 carbon atoms.

Example 5

To a reaction vessel equipped as above is added 100 ml. of methyl alcohol and 15 ml. of EI. A quantity of 3 g. of acid-form Amberlyst 15 sulfonic acid ion exchange resin, supplied by the Rohm and Haas Company, is added, and the mixture is stirred for 15 minutes. Analysis shows a 10.4 percent conversion of EI and a 98.4 weight percent yield of dimer and a remainder of the trimer.

Propylenimine and butylenimine may be substituted for EI in the above examples to give a similar polymeric product terminated by aziridine rings.

ALUMINUM TRIALKYL CATALYSTS

Example 6

Into a reaction vessel equipped with a means for stirring, temperature control, and refluxing are placed 200 ml. of benzene dried over sodium and 41.6 g. of dry EI. A nitrogen purge is started through the apparatus, and 8 g. of a 25 percent by weight solution of triisobutyl aluminum in toluene is added to the vessel. This mixture is stirred at room temperature for 30 minutes, and 10 g. more of the triisobutyl aluminum catalyst solution is added. The resulting mixture is then stirred at room temperature for 64 hours, refluxed for 34 hours at a temperature of 80° C., cooled, and 50 ml. of anhydrous ethanol is added to hydrolyze any remaining catalyst. The solvents are removed under reduced pressure. A quantity of 12.5 g. of the polymer product is obtained, which represents 30 percent of the initial EI charged. This product is treated with ethanol to remove catalyst residue. The resulting product is a brown viscous liquid having an I.R. spectrum consistent wtih the following structure:

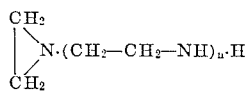

wherein the average value for $n$ is 6.0. Thus, the polymer has an average molecular weight of about 300. The product has an aziridine ring content of 14.0 weight percent, an average of 1.0 terminal aziridine rings per molecule.

Example 7

A quantity of 250 ml. of toluene dried over sodium and 41.6 g. of dry ethylenimine are added to a reaction vessel equipped as in Example 1. A nitrogen purge is started through the apparatus, and 16.64 g. of a 25 weight percent solution of triisobutyl aluminum in toluene is added to the vessel. The resulting mixture is refluxed for 30 hours at a temperature of 110° C., cooled, and 50 ml. of anhydrous ethanol added to hydrolyze any remaining catalyst. The solvents are removed under reduced pressure. There is obtained 25.4 g. of polymeric product, which represents 61 percent of the initial EI charged.

The product is a dark yellow viscous liquid which has an I.R. spectrum consistent with the formula given in Example 1. The average value for $n$ is found to be 7.16, which gives an average molecular weight of about 350 for the polymer. The product has an aziridine ring content of 12.0 weight percent, an average of about 1.0 terminal aziridine rings per molecule.

Example 8

A quantity of 200 ml. of toluene dried over sodium and 41.6 g. of EI are added to a reaction vessel as above. A nitrogen purge is started through the apparatus, and 24.96 g. of a 25 percent by weight solution of triisobutyl aluminum in toluene is added to the vessel. This mixture is heated to 80° C. for 24 hours, cooled to 50° C., and 12.48 g. additional catalyst solution is added. The reaction mixture is then heated at 80° C. for 46 hours with continuous stirring, heated at 80° C. for 26 hours without stirring, cooled and 30 ml. of dry methanol is added to hydrolyze any remaining catalyst in the mixture. The solvents are removed under reduced pressure. The product is treated with ethanol to remove any catalyst residue. There is obtained 36.7 g. of a yellow viscous liquid, which represents 88 percent of the initial EI charged. An I.R. spectrum is obtained which indicates the same structure as in Examples 1 and 2, with an average value for $n$ of 12.6, or a molecular weight of about 600. The product has an aziridine ring content of 7.2 weight percent, or an average of 1.0 terminal aziridine rings per molecule.

Example 9

The utility of the above polymeric products as bactericides is evaluated. The products of Examples 1–3 are streaked across petri dishes containing nutrient agar which is streaked with E. coli. After 48 hours at room temperature, it is observed that the growth of bacteria occurred in every place except where the test compounds are streaked.

For comparative purposes, PEI prepared from EI and an acid catalyst in water is analyzed for aziridine rings. To a 10 gallon glass-lined Pfaudler kettle is charged 20 pounds of distilled water and 0.4 pound sulfuric acid. The acid solution is heated and maintained at 90° C., and 20 pounds of EI is added over a 4 hour period. After an additional 3 hours at this temperature the product is cooled and analyzed. The molecular weight of the resulting polymer is found to be 4,150 by ebullioscopy. Analysis of this polymer by the same infrared spectra technique used above shows that the product contains no aziridine ring end groups. The lowest detectable limit of aziridine ring groups by this analysis is 500 parts per million. Analyses are easily performed by this technique for aziridine ring end groups in the range of 0.05 weight percent or greater.

A sample of commercial PEI supplied by the Chemirad Corporation and identified as having a molecular weight of about 30,000 is analyzed by the infrared technique. This analysis shows that the product contains no aziridine ring end groups.

What is claimed is:

1. A process for preparing a polymer of an alkylenimine which comprises combining an alkylenimine under anhydrous conditions with an aluminum trialkyl catalyst, allowing the alkylenimine to polymerize until a polymer having an average molecular weight of between about 300 and about 3,000 is obtained, and stopping the polymerization by neutralizing the catalyst.

2. The process of claim 1 wherein the alkylenimine and the catalyst are dissolved in an inert, nonpolar solvent, the alkylenimine is polymerized at a temperature within the range between 20° C. and the boiling point of the resulting mixture, and the polymerization is stopped by the addition of a sufficient amount of a polar solvent to neutralize the aluminum trialkyl catalyst by hydrolysis.

3. The process of claim 2 wherein the catalyst is triisobutyl aluminum, the inert solvent is benzene, toluene, n-heptane, cyclohexane, or 2-ethylhexane, and the polar solvent is methyl alcohol or ethyl alcohol.

References Cited

UNITED STATES PATENTS 3,033,746  5/1962  Moyle et al. _____ 167—31

FOREIGN PATENTS 809,414  12/1936  France.

OTHER REFERENCES

Barb, "Journal Chem. Soc.," London, 1955, pp. 2564–2577.

Barb, "Journal Chem. Soc.," London, 1955, pp. 2577–2580.

Scholler, 45 Chem. Abstracts 5372 (1951) (abstract of German 802,346).

Noller, Chemistry of Organic Compounds (1951), W. B. Saunders Co., publ., p. 696.

Zhuk et al., Russian Chemical Reviews," vol. 34, No. 7 (July 1965), pp. 515–527.

SAMUEL H. BLECH, Primary Examiner

U.S. Cl. X.R.

260—2, 830; 424—244